United States Patent [19]

Sugeta

[11] Patent Number: 4,832,278
[45] Date of Patent: May 23, 1989

[54] FISHLINE WINDING DIRECTION CHANGEOVER MECHANISM FOR A FISHING REEL WITH A SPOOL SHAFT SUPPORTED AT ONE END

[75] Inventor: Hideki Sugeta, Hiroshima, Japan

[73] Assignee: Ryobi Ltd., Hiroshima, Japan

[21] Appl. No.: 188,374

[22] Filed: Apr. 29, 1988

[51] Int. Cl.⁴ .............................................. A01K 89/02
[52] U.S. Cl. .............................. 242/84.5 R; 188/82.2; 192/43.1
[58] Field of Search ............... 242/84.5 R, 84.5 A, 242/84.51 R, 84.51 A, 84.52 R; 188/82.2, 82.7, 83; 192/43.1, 8 R

[56] References Cited

U.S. PATENT DOCUMENTS

| | | | |
|---|---|---|---|
| 1,835,675 | 12/1931 | Smith et al. | 188/82.2 X |
| 2,059,763 | 11/1936 | Wenzel | 242/84.5 R |
| 2,059,765 | 11/1936 | Adams | 242/84.51 |
| 2,460,904 | 2/1949 | Reyburn | 242/84.52 |
| 2,551,309 | 5/1951 | Allison | 242/84.51 R |
| 3,574,339 | 4/1971 | Sarah | 242/84.5 A |
| 4,657,201 | 4/1987 | Munroe | 242/84.5 R |
| 4,728,054 | 3/1988 | Pisapio | 242/84.51 A |
| 4,750,687 | 6/1988 | Sievert et al. | 242/84.51 A X |

FOREIGN PATENT DOCUMENTS

| | | | |
|---|---|---|---|
| 33989/77 | 8/1975 | Japan | 242/84.52 R |
| 102921 | 1/1924 | Switzerland | 188/82.2 |

*Primary Examiner*—Joseph J. Hail, III
*Attorney, Agent, or Firm*—Finnegan, Henderson, Farabow, Garrett, & Dunner

[57] ABSTRACT

The present invention pertains to a fishing reel fishline winding direction changeover mechanism which allows for winding in the left-handed and right-handed positions. The mechanism allows switching of the reel, and changing over the transmission of the braking force for the left or right-handed positions, and can be easily and quickly performed without attaching and detaching any component parts. The structure includes first and second brake pawls which are pivotally coupled to a brake plate, and can be swung by elastic urging into engagement with a ratchet wheel.

5 Claims, 2 Drawing Sheets

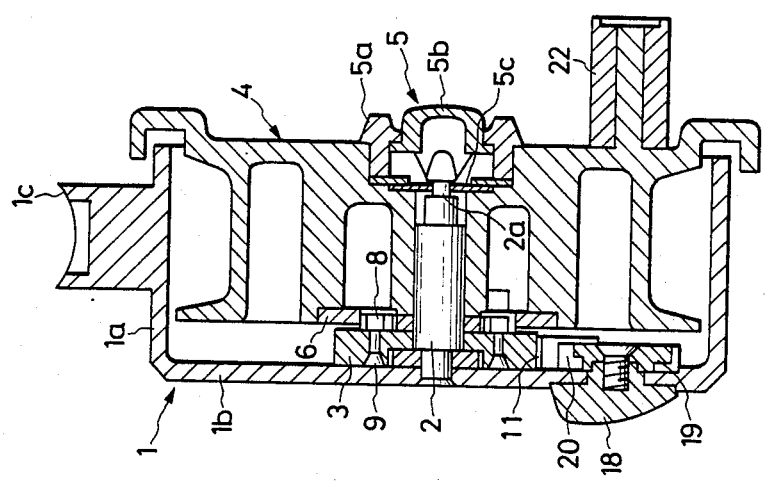
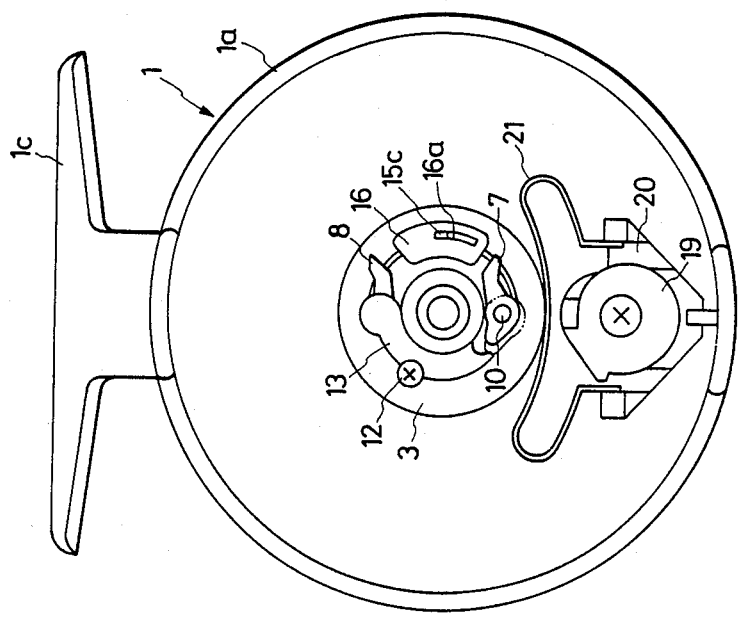

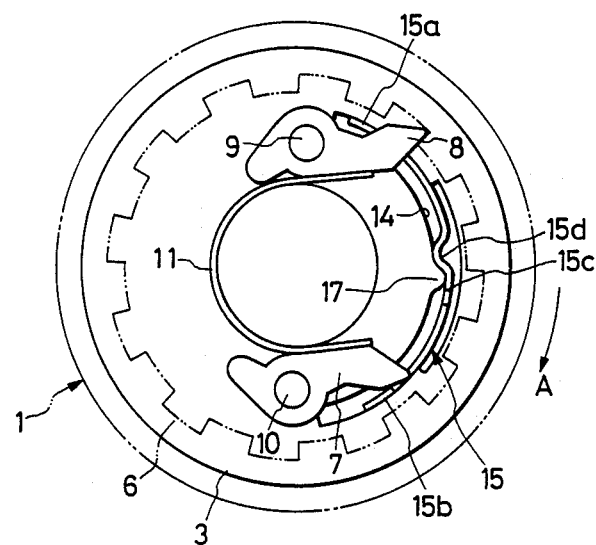
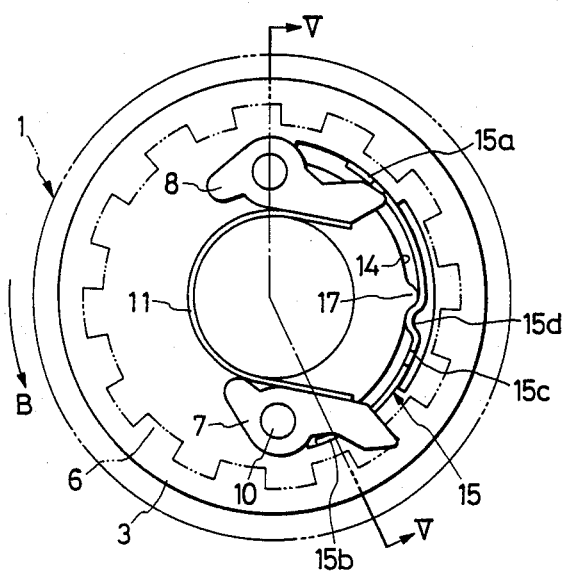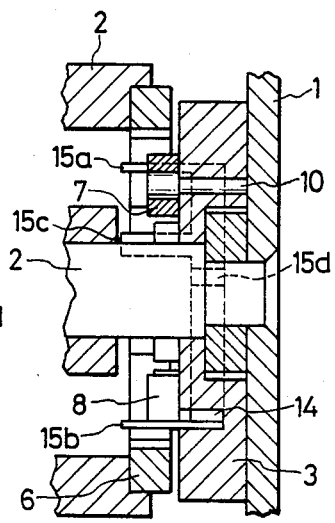

4,832,278

FISHLINE WINDING DIRECTION CHANGEOVER MECHANISM FOR A FISHING REEL WITH A SPOOL SHAFT SUPPORTED AT ONE END

FIELD OF THE INVENTION

The present invention relates to a fishing reel fishline winding direction changeover mechanism with a spool shaft supported at one end.

BACKGROUND OF THE INVENTION

Generally, when one uses his right hand as compared to when one uses his left hand to rotate a fishing reel, it is convenient to rotate the winding handle in a clockwise direction and counterclockwise direction respectively. Consequently, it is beneficial to have a fishing reel that may be readily switched from one's right hand to one's left hand.

Conventionally, as disclosed in the Japanese Utility Model Application (OPI) No. 33989/77 (the term "OPI" as used herein means an "unexamined published application"), a fishing reel includes a brake drum provided with a pawl. The pawl is engaged with a ratchet wheel for applying a braking force to a spool in one direction. One resultant drawback of the conventional structure, based on the inability to transmit the braking force to the spool in more than one direction, is that winding may only be performed by using either one of a right-handed position or left-handed position.

The conventional answer to this drawback involves attaching a brake pawl for alternately switching the reel to either a right-handed or left-hand winding position. The problem with this conventional response is that component parts, such as the brake pawl, must be removed and are likely to become lost. For that reason, it is troublesome and difficult to switch the fishing reel for either of the right-handed and the left-handed winding positions.

SUMMARY OF THE INVENTION

An object of the present invention is to provide a fishline winding direction changeover mechanism for a fishing reel such that it may be wound in either left-handed or right-hand winding positions.

Another object of the present invention is to allow for interchangeably switching of the brake pawl from either right-handed or left-handed winding without removal or detachment of a component part.

A further object of the present invention is to overcome the problems and disadvantages of the conventional fishing reel.

To achieve the objects and in accordance with the purpose of the invention, as embodied and broadly described herein, a reel body on which a brake plate and a spool are rotatably supported is provided. The brake plate and the spool are coaxial with one another. The spool is supported at one end by a spool shaft connected to the reel body. Further, first and second brake pawls are utilized for alternately winding the fishline in right-handed and left handed positions, respectively. The first and second brake pawls are placed at opposite positions and are attached to the brake plate. This attachment allows the swinging of the first and second brake pawls into engagement with the rachet wheel. The first and second brake pawls are urged toward the rachet wheel by a pawl spring. A right-handed and left-handed changeover spring is engageable with the first and second brake pawls for selective engagement with the ratchet wheel.

In the present invention the switching of the reel, and the changing over of the transmission of the braking force for the left or right-handed positions can be easily and quickly performed without attaching or detaching any component parts. Accordingly, a spool shaft supported at one end is provided. Brake pawls, for handles position able in either the right-handed or left-handed positions, are provided in mutually opposite positions. These brake pawls are pivotally coupled to a brake plate so that they can be swung by elastic urging. The brake pawls are selectively engaged by a right-handed and left-handed position changeover spring to wind a fishline in right-hand and left-handed positions.

In the fishline winding direction changeover mechanism, the brake plate and a spool are rotatably supported coaxially with each other at the body of the fishing reel. A ratchet wheel is secured to the spool, and the brake pawls are attached to the brake plate so that the brake pawls can be swung into engagement therewith. A pawl spring urges the brake pawls toward the ratchet wheel and the right-handed and left-handed position changeover spring. The changeover spring engages with the brake pawls to alternately engage and disengage the brake pawls with the ratchet wheel. The changeover spring is attached so that it is slidable.

The transmission of the braking force to the spool therefore, can be changed over for either of the right-handed and the left-handed positions to wind the fishline on the spool without removing a component part. To do so the right-handed and left-handed positions changeover spring is slid rightwardly or leftwardly of the brake pawl in order to selectively place the handle in the right-handed or left-handed position for winding.

DESCRIPTION OF THE DRAWINGS

The accompanying drawings, which are incorporated in and constitute a part of this specification, illustrate several exemplary embodiments of the invention and together with the description, serve to explain the principles of the invention.

FIG. 1 shows a front view of an embodiment of a fishing reel of the present invention depicting the fishline winding direction changeover mechanism;

FIG. 2 shows a longitudinally sectional view of the embodiment of a fishing reel of the present invention with the attached spool;

FIG. 3 shows a front view of the embodiment of a fishing reel of the present invention in a clockwise winding position;

FIG. 4 shows a front view of the embodiment of a fishing reel of the present invention in a counterclockwise winding position; and, FIG. 5 shows a sectional view of the embodiment of a fishing reel of the present invention along a line V—V shown in FIG. 4.

DETAILED DESCRIPTION OF THE PREFERRED EMBODIMENT

FIGS. 1, 2, 3, 4 and 5 show the fishing reel embodiment including a fishline winding direction changeover mechanism having a spool shaft 2 supported at one end. The fishing reel bodoy 1 is circular cup shaped and, has a U-shaped cross section. A holder 1c projects from the peripheral portion 1a of the reel body 1 for attaching the fishing reel to a fishing rod. The reel body 1 includes a disk-shaped side plate 1b through which the spool shaft 2 extends horizontally. At the butt of the spool shaft 2, a disk-shaped brake plate 3 is rotatably supported.

A spool 4 is supported on the spool shaft 2 and, is fitted with a stopper 5 so that the spool can be rotated either backwardly or forwardly and can be selectively attached or detached. The stopper 5 comprises a body 5a, a pusher 5b, and an elastic engaging member 5c. At the inner end of the body 5a is the elastic engaging member 5c which is capable of being engaged with and disengaged from the spool shaft neck 2a. The pusher 5b can be pressed into the body 5a to elastically deform the elastic engaged member 5c. The stopper 5 is formed to allow for selective attachment and detachment of the spool 4 to the spool shaft 2. The stopper 5 may, for example, be a conventional screw. A handle 22 is provided on the spool 4.

A ratchet wheel 6 is secured to the end of the spool 4 inwardly toward the body 1 and the brake plate 3. The ratchet contains internal teeth. A first brake pawl 7 and a second brake pawl 8 are provided for winding a fishline in a left-handed and right-handed positions, respectively. The first and second brake pawls 7 and 8 are mutually symmetrically positioned and pivoted to the brake plate 3 by pins 9 and 10 so that the first and second brake pawls 7 and 8 can be selectively swung into engagement with and disengagement from the ratchet wheel 6. A pawl spring 11 urges the first and second brake pawls 7 and 8 into engagement with the ratchet wheel 6. A hold-down plate 13 is attached to the brake plate 3 by a screw 12 and prevents the first and second brake pawls 7 and 8 from coming off.

The brake plate 3 is provided with an arc-shaped groove 14 having a circumferential length for both the first and second brake pawls 7 and 8. A right-handed and left-handed positions changeover spring 15, shaped as a band, is fitted in the groove 14 so that the spring is slidable in the longitudinal direction. At both ends of the spring 15 are bent projections 15a and 15b which act to engage the brake pawls 7 and 8 with the ratchet wheel 6. As a result, by the sliding of the spring 15 the brake pawls maya be swung in the direction so as to allow selective disengagement with the ratchet wheel 6. Additionally, the spring 15 has a control bent projection 15c, located at the central portion of the spring 15, and projects in the same direction as the bent projections 15a and 15b. A hold-down plate 16, secured on the brake plate 3, holds the spring 15 down so that the spring may not move out of the groove 14. The control bent projection 15c, of the spring 15, extends toward the spool 4 through the arc-shaped opening 16a of the hold-down plate 16 so that the spring may slide. Further, the spring 15 comprises a positioning portion 15d which is curved nearly semicircularly, and when slid causes the spring 15 to become elastically deformed. When positioning portion 15d moves over a stopper 17, which projects from the inside surface of the groove 14, engagement thereof results.

A mechanism for applying a braking force to the brake plate 3 will now be described. An adjusting lever 18 includes a cam 19 at its inner end, and is rotatably supported by the side plate 1b of the reel body 1. A brake spring 21 is fitted to a slider 20 which is provided inside the side plate 1b. As a result, the slider can be slid by the cam 19, upwardly and downwardly in the direction toward and away from the brake plate 3. The brake spring 21 is placed in elastic contact with the outside circumferential surface of the brake plate 3. To optionally regulate the braking force on the brake plate, the cam 19 is turned by the adjusting lever 18 to slide the slider 20 in an upwardly and a downwardly direction thereby adjusting the pushing force of the brake spring 21 on the brake plate 3.

The operation of the fishline winding direction changeover mechanism will now be described. FIG. 3 shows the mechanism for winding the fishline in the right-handed position allowing for clockwise winding. In this position, the first brake pawl 7, which is employed for winding the fishline in the left-handed position, is disengaged from the ratchet wheel 6. However, the second brake pawl 8, which is used for winding the fishline in the right-handed position, is engaged with the ratchet wheel for the right-handed winding direction or backward rotation direction A of the spool 4.

In order to allow for the left-handed position, assuming the fishline winding direction changeover mechanism is in the above-mentioned state for winding the fishline in the right-handed position, the right-handed and left-handed position changeover spring 15 is slid in the groove 14 in the clockwise direction. Next, the second brake pawl 8, engaged with the projection 15a of the spring, is swung against the force of the spring so that the second brake pawl 8 is disengaged from the ratchet wheel 6. At this time, the projection 15b, of the spring 15, stops pushing the first brake pawl 7, and it is swung by the pawl spring 11 and engaged with the ratchet wheel 6. As a result, the fishline winding direction changeover mechanism is placed in the left-handed position for winding, as shown in FIG. 4. In this position the spool 4 can be rotated in the left-handed winding direction depicted by arrow B.

When it is desired to shift the fishline winding direction changeover mechanism from the left-handed winding to the right-handed winding position, the right-handed and left-handed position changeover spring 15 is slid counterclockwise (from a position shown in FIG. 4) so that the first brake pawl 7, which is engaged with the projection 15b of the spring, is disengaged from the ratchet wheel 6 and the second brake pawl 8 engages the ratchet wheel 6, thus, the fishline winding direction changeover mechanism is placed in the right-handed winding position as shown in FIG. 3.

The sliding of the right-handed and left-handed positions changeover spring 15 is performed by removing the spool 4 from the spool shaft 2 and manually operating the manipulating bent projection 15c of the spring.

When the spool 4 is rotated forwardly, in the directions A and B in the right-handed and left-handed winding positions respectively, the first and second brake pawls 7 and 8 escape the force of the pawl spring 11 so that the brake pawls are not disengaged from the ratchet wheet 6. However, when the spool 4 is rotated backwardly, or inversely to the directions A and B in the right-handed and left-handed winding positions respectively, the first and second brake pawls 7 and 8 engage with the ratchet wheel 6 so that the brake plate 3 is rotated. Consequently, the braking force applied to the brake plate 3 by the brake spring 21 is transmitted to the spool 4 through the brake plate.

What is claimed is:

1. A fishline winding direction changeover mechanism for a fishing reel for winding a fishline in a right-handed and a left-handed position comprising:

a reel body on which a brake plate and a spool, coaxial with one another, are rotatably supported;

a spool shaft, having an end, wherein said end is supported on said reel body;

a ratchet wheel secured to a surface of said spool confronting with an inside surface of said reel body;

first and second brake pawls applied to a braking force transmitting changeover in a right-handed position and in a left-handed position, respectively, provided opposite one another, and attached to said brake plate such that said first and second brake pawls can be swung into engagement with said ratchet wheel;

a pawl spring for urging said first and second brake pawls toward said ratchet wheel; and, a right-handed and a left-handed position changeover spring, engagable with said first and second brake pawls to alternately engage and disengage said pawls with said ratchet wheel, said changeover spring being slidably attached to said brake plate.

2. A fishline winding direction changeover mechanism for a fishing reel according to claim 1, further comprising:

said brake plate provided with an arc-shaped groove for receiving said changeover spring for slidably controlling the engagement and disengagement of said brake pawls and said ratchet wheel.

3. A fishline winding direction changeover mechanism for a fishing reel according to claim 2, further comprising:

said changeover spring including bent projections, engagable with said brake pawls, for selective engagement of said ratchet wheel.

4. A fishline winding direction changeover mechanism for a fishing reel according to claim 2, wherein said changeover spring comprises a positioning portion which is curved nearly semicircularly and said arc-shaped groove has a stopper projected from the inside surface of said groove, engaged with said positioning portion and causing said positioning portion to become elastically deformed, whereby said changeover spring is kept in the right-handed or the left-handed position, respectively.

5. A fishline winding direction changeover mechanism for a fishing reel according to claim 1, further comprising:

a hold-down plate located above said changeover spring, and including an arc-shaped opening; and, said changeover spring including a control bent projection extending through said arc-shaped opening for manual operation such that said changeover spring may selectively be slid to the right-handed and the left-handed positions.

* * * * *